Oct. 22, 1935.　　　　C. RICHTER　　　　2,018,574
LOCK BOLT
Filed June 6, 1934
Fig.1.
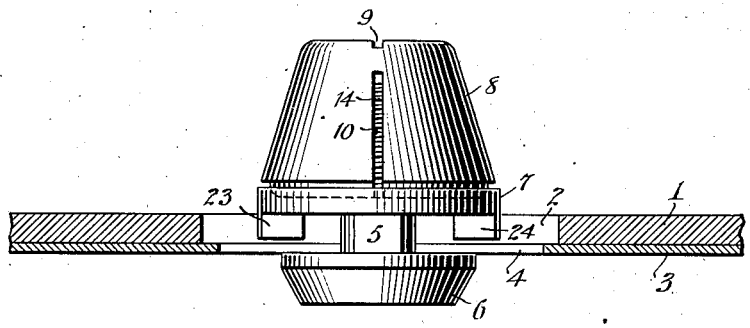
Fig.2.
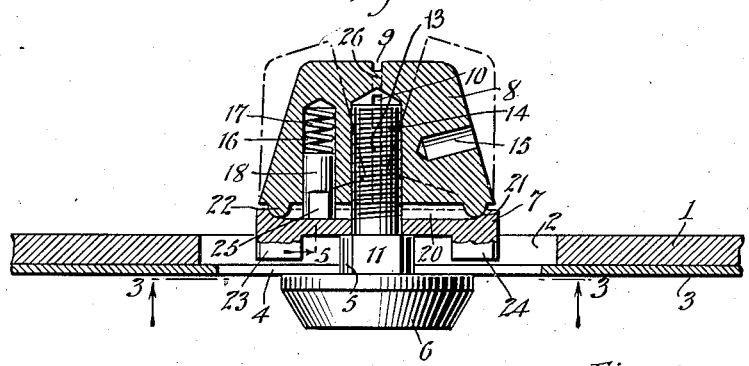
Fig.3.
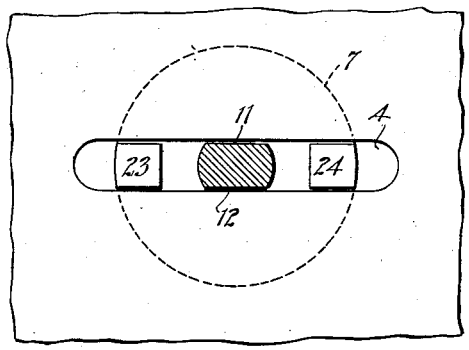
Fig.4.
Fig.5.
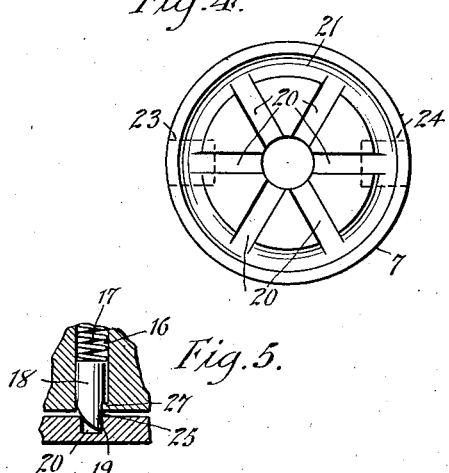
WITNESSES
Edw. Thorpe
A. L. Kitchin
INVENTOR
Charles Richter
BY
Munn, Anderson & Liddy
ATTORNEY Patented Oct. 22, 1935

2,018,574

UNITED STATES PATENT OFFICE 2,018,574

LOCK BOLT

Charles Richter, Tampa, Fla., assignor of one-half to Nelson C. Geise, Palatka, Fla.

Application June 6, 1934, Serial No. 729,300

4 Claims. (Cl. 40—125)

This invention relates to safety lock bolts, adapted to general use but particularly adapted for use where two or more articles are to be fastened together either permanently or until such time as the bolt is to be broken for disconnecting the parts.

An object of the present invention is to provide an improved construction which is easy to apply but which cannot be removed without being cut or broken.

A further object of the invention is to provide an improved safety lock bolt for locking the license plates of automobiles on to the brackets and holding them in place until the bolt or some part thereof has been cut or broken.

An additional object, more specifically, is to provide a safety lock bolt including a nut and lock washer wherein the parts may be readily assembled but a portion of which must be sawed or cut when desired to be removed, so that the nut may be moved from its engagement with the bolt.

In the accompanying drawing—

Figure 1 is a side view of a safety lock bolt disclosing an embodiment of the invention, the same being shown in connection with an automobile license plate or tag, the same being in section;

Figure 2 is a view similar to Figure 1 except that the lock bolt is also in section;

Figure 3 is a sectional view through Figure 2 approximately on the line 3—3;

Figure 4 is a top plan view of the lock washer shown in Figures 1 and 2;

Figure 5 is an enlarged detailed fragmentary sectional view on the line 5 of Figure 2.

Referring to the accompanying drawing by numeral, 1 indicates an ordinary bracket which is part of an automobile or other vehicle, the same being provided with a slot 2 and adapted to receive a license plate or tag 3, which is provided with a slot 4 through which the shank 5 of the bolt 6 is adapted to pass when the bolt is used for clamping the license plate to the bracket.

In order to prevent accidental loss or theft of the license plate or tag, the locking bolt shown in Figs. 1 and 2 is of great advantage as it will function to act in a mechanical manner to firmly hold the license plate in position. The bolt also may be readily applied and moved into clamping position, but cannot be removed even by the owner without breaking certain parts of the bolt structure, which structure includes the bolt 6, the lock washer 7 and the lock nut 8. When the owner or any other person desires to remove the bolt, a hack saw is inserted in the notch 9 and the nut is sawed downwardly to the slot 10, whereupon the nut 8 is divided into two parts and may be readily swung to one side, as indicated by the dotted lines in Fig. 2. The bolt 6 is provided with a suitable head integral with the shank 5, which shank has flattened sides 11 and 12, as shown in Fig. 3, whereby it may readily extend through the slots 2 and 4 but cannot rotate in the slot 2. This shank is comparatively short but merges into the round threaded section 13, which coacts with the threaded bore 14 of nut 8. In addition to the slot 10 and notch 9, nut 8 is provided with an opening or bore 15 in which a pin or other instrument may be inserted to rotate the nut when applying the same. Also, the nut 8 is provided with a bore 16 in which a spring 17 is mounted and a reciprocating catch 18. This catch, as shown particularly in Fig. 5, is provided with a pointed end 19 adapted to fit into one of the grooves 20 in the lock washer 7. The grooves 20 merge into an annular groove 21 adapted to receive the diametrically oppositely positioned, rounded bead 22 formed on the lower surface of the nut 8.

The lock washer 7 is also provided with a pair of depending lugs 23 and 24, as shown particularly in Fig. 2 and 3, said lugs extending downwardly into the slot 2 so that the lock washer cannot rotate when in this position.

When the device is being applied the bolt 6 is first moved to the position shown in Fig. 2 and then the lock washer 7 is slid over the threaded end of the bolt and downwardly to the position shown in Fig. 2, with the lugs 23 and 24 extending into slot 2. Nut 8 is then placed on top of the threaded portion 14 and rotated in the usual manner until it is screwed down tightly. As it nears the lock washer 7 the catch 18 will snap into the various radiating grooves 20 as the bolt rotates. It will be noted that the catch 18 is provided with a flattened portion 25 adapted to fit flatwise against the side walls of the respective grooves, and thereby permit the catch to remain in proper place and prevent a reverse rotation of the nut 8. The extension 27 is bent into the position shown in Fig. 5 to prevent the loss of the catch 18 when the nut is not in use. It will be evident that a Stillson wrench or a wrench of some other kind may be used to tighten the nut, though ordinarily a pin inserted into the bore 15 is sufficient to secure the desired result.

After the nut 8 has been screwed down tightly for properly clamping the license plate or tag 3, the nut cannot be removed or any part of the lock bolt removed without breaking some of the parts.

When a person desires to remove the tag a hack saw is inserted into the notch 9 and a short section 26 is sawed away or sawed down until it merges into the sawcut 10, whereupon the nut will fall apart. It will be understood that the sawcut is on each side of the bore 14 so that when the small section 26 is removed the nut is in two parts and is adapted to be swung downwardly, as shown in Fig. 2, and lifted out of place. The bolt 6 may then readily be pulled away as well as the washer 7.

When it is desired to replace the lock bolt it will be necessary to provide a new nut, though the lock washer and bolt may be used a second time.

While this device has been illustrated in respect to automobile licenses or tags, it will be understood that it may be used in many places without departing from the spirit of the invention.

I claim:

1. A safety lock bolt comprising a bolt member having a threaded portion and a head, having on one face an annular groove and a lock washer, a plurality of radiating grooves merging into the annular groove, and a pair of lugs on the other face, a nut adapted to be screwed onto the threaded part of said bolt member, said nut having slots cut therein from the inner end to a point near the upper end, and at the outer end being formed with a notch in line with said slot, so that when the material is removed between the notch and the slots said nut will be divided in two, said nut being provided with a projection fitted into said annular groove in said lock washer, and a reciprocating catch carried by the nut positioned to snap into any of said radiating grooves in said lock washer, whereby when said nut is screwed down tightly against said lock washer it cannot be removed until divided in half.

2. A safety lock bolt in combination with a support having a slot including a bolt structure having a head, a flattened shank fitted into said slot whereby the bolt cannot rotate, and a threaded extension, a washer fitting over said threaded extension and against said shank, said washer at the lower face having a pair of lugs fitting into said slot, and on the other face having a plurality of radiating grooves, a nut screwed onto said threaded portion for securing the parts together, and a spring pressed catch carried by said nut coacting with said notches for preventing a reverse rotation of said nut.

3. In a lock bolt of the character described, a threaded bolt structure and a nut carried thereby, said nut having a threaded bore for receiving said threaded bolt structure, a pair of slots, said slots being on diametrically opposite sides of said bore and extending from the inner face of the nut to near the outer face, a notch arranged in said outer face in line with said slots, the part of said nut between said notch and said slot being adapted to be cut when the bolt is to be removed, and a reciprocating locking catch carried by said nut normally projecting from the inner face thereof.

4. In a locking bolt, a nut formed with a centrally positioned threaded bore extending from the inner face of the nut towards the outer face but not through the nut, said nut being provided with a saw cut extending from the inner face towards the outer face for substantially the same distance as said bore, and a second saw cut extending from said outer face towards the first mentioned saw cut, said second saw cut being comparatively shallow so that there will be left an uncut portion between the two saw cuts.

CHARLES RICHTER.